G. S. STRONG.
WINDMILLS.

No. 194,314. Patented Aug. 21, 1877.

Attest:
A. M. Smith
John G. Center

Inventor:
Geo. S. Strong.

UNITED STATES PATENT OFFICE.

GEORGE S. STRONG, OF SPRINGFIELD, OHIO.

IMPROVEMENT IN WINDMILLS.

Specification forming part of Letters Patent No. 194,314, dated August 21, 1877; application filed June 20, 1877.

*To all whom it may concern:*

Be it known that I, GEORGE S. STRONG, of Springfield, county of Clarke, State of Ohio, have invented certain new and useful Improvements in Windmills, of which the following is a full, clear, and exact description, reference being had to the accompanying drawings, making part of this specification, in which—

Figure 1:
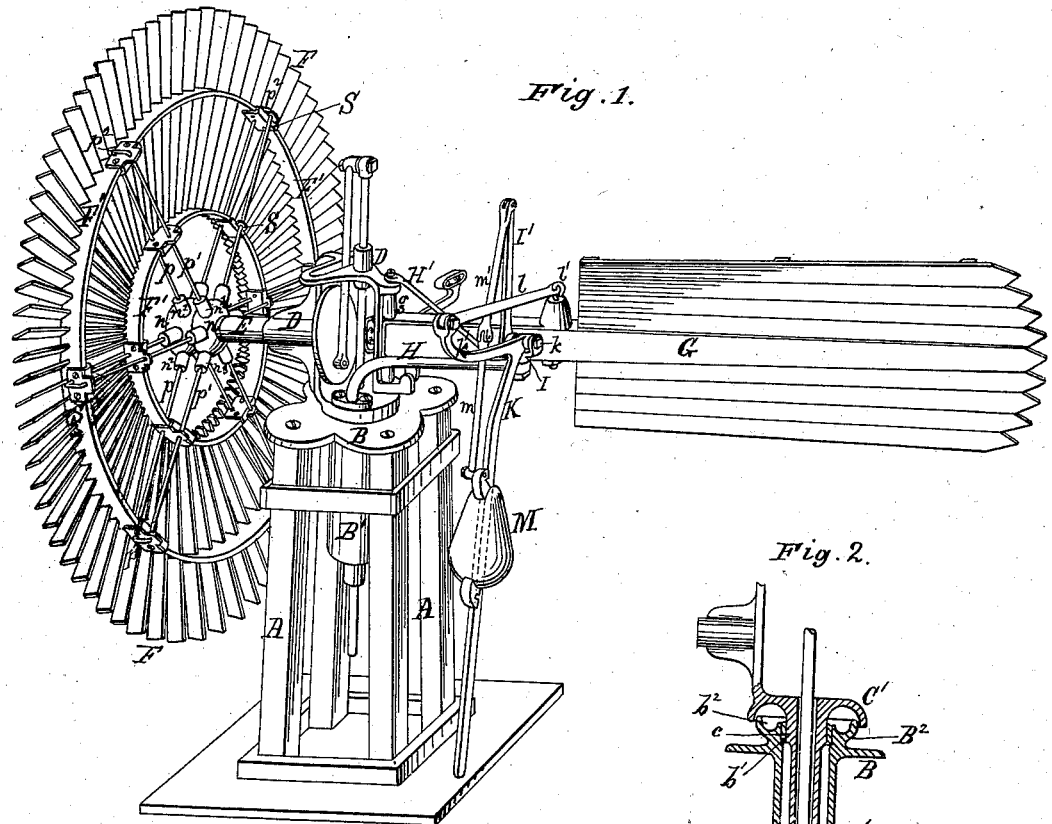
Figure 2:
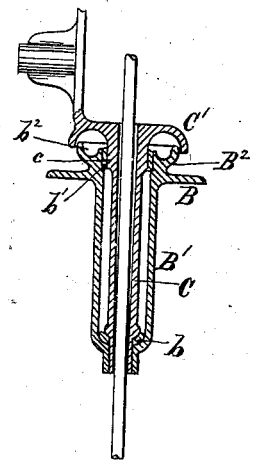
Figure 3:
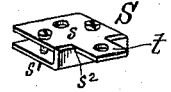

Figure 1 is a perspective view of my improved wind mill or engine. Fig. 2 represents a section through the tubular bearing of the vertical swiveling-shaft of the mill; and Fig. 3 is a perspective view of one of the clamps for connecting the fan-wheel with its supporting-arms.

Similar letters of reference denote corresponding parts wherever used.

My invention relates to that class of wind mills or engines in which the wind-wheel is adapted to be deflected by the force of the wind from a position at, or nearly at, a right angle to the tail-vane, to one at or nearly in a line parallel with said vane, for throwing it out of the wind or out of action, as required; and it consists, first, in the combination, with a wheel arranged as above described, of a sliding weight, adapted to be moved automatically back and forth, or out and in, on its supporting-arm by the movements of the wheel itself, in such manner that, as the shaft of the wheel is deflected from a position in line, or thereabout, with the vane, the resistance to its further deflection will be steadily increased, and vice versa, as hereinafter explained. It further consists in a novel construction of the radial arms of the wind-wheel, whereby greater strength is secured with less weight of material than as ordinarily constructed, said arms consisting of a single light rod secured at its center, forming the outer end of the arm, and having its two ends connected with the central hub or hubs, as will be explained; it further consists in a novel construction of clamps for connecting the wheel with its radial supporting-arms; it further consists in making the lower bearing of the vertical swiveling-shaft of the windmill conical or hemispherical in form for the purpose of more perfectly centering the same, and at the same time reducing friction; and the invention consists, finally, in certain details of construction and arrangement hereinafter fully explained.

In the accompanying drawings, A represents the tower, consisting ordinarily of four or more stout converging uprights, properly secured and braced, though, of course, any preferred form or construction of tower may be employed adapted to the purpose for which the mill is to be used.

B is the base-plate of the lower fixed portion of the turn-table, rigidly secured to the top of the tower or uprights A, and having the centrally-arranged pendent cylinder $B^1$, in which are the bearings for the vertical spindle on which the wheel swings, the lower bearings $b$ therefor being formed by contracting the lower end of the cylinder into a hemispherical or inverted conical concavity, in which the lower end of the tubular spindle C, made in corresponding form, is stepped, as shown in Fig. 2. The bearing or step $b$ is thus made to take the weight of the wheel and its attachments, and is adapted by its form to support said weight and permit the free turning of the spindle with the smallest possible amount of friction.

The upper bearing $b^1$ is formed in a hub or enlargement, $B^2$, of the cylinder $B^1$, above the plate B, a hub or collar, $c$, on the spindle C at that point resting in said bearing and preventing lateral movement or play of the spindle. These bearings are, by preference, made first of brass or some other anti-friction metal, and are then placed in the mold for the casting B $B^1$, and the metal for the latter is cast around them, and, fusing or uniting therewith, a permanent anti-friction bearing is formed in a cheap but substantial manner.

The bearing points or surfaces on the spindle, matching the bearings above described, are cast on a chill by means of iron chill-plates placed in the mold.

The hub or enlargement $B^2$ is provided with an annular groove on its upper end or face at $b^2$, for containing lubricating material, and this is covered by a similarly-grooved inverted cap plate, C', on the hollow spindle C.

The yoke D, in which the bearings for the main driving-shaft E and piston-rod are formed, and to which the tail-vane is pivoted, and the wheel F itself, except in particulars hereinafter specified, are substantially the same in construction and arrangement as are shown and described in former patents to me, and they need not, therefore, be here described in detail.

The tail-vane G is connected with the yoke at its rear face, opposite to the wheel F, by a vertical pivot at $g$, and at one side of the yoke D, opposite to that on which the wheel-shaft is deflected, is an arm, H, rigidly secured to the swiveling cap-plate or turn-table C', said arm extending to the rear by the side of the tail-vane, and forming a support for a weighted lever, in a manner described in Letters Patent granted to me March 21, 1876. The outer end of said arm is connected by a brace, H', with the upper end of the swiveling-yoke D, said brace serving to permit the arm H to be made much lighter than it could be without it.

The outer end of arm H has a vertical eye or sleeve bearing, in which is mounted a swiveling-pin, I, forked on its head or upper end to receive an elbow or bent lever, K, connected therewith by a horizontal pivot at $k$. The short upper arm $k'$ of the lever K is connected by a link, $l$, with a hook or eye at $l'$ on the tail-vane, as shown, and the long arm of said lever has a sliding weight, M, on it, said weight being connected by a jointed link, $m\, m'$, with one of the arms I' of the fork swivel-pin I, said arm being extended above the fulcrum of lever K, as shown, for that purpose.

By this arrangement of the weighted lever K and its supports, it will be seen that as the arm is vibrated with the wheel and turn-table relatively to the vane, and moves away from the latter, the link $l$, acting on the arm $k$ of the lever K, raises the weighted arm, and, as the latter rises approaching the arm I', the weight is forced outward and away from the fulcrum of the lever by the link $m\, m'$, and is thus made to increase the resistance offered by said weight to the deflection of the wheel from the face of the wind.

The swiveling-fulcrum I of the weighted lever permits the latter to swing sufficiently to maintain at all times a direct line of resistance between the vane and the weighted lever, and avoids all cramping or twisting of the parts.

The weight is thrust outward or drawn inward, as the case may be, by the link $m\, m'$, and the joint in the latter obviates all danger of accident to the link in the event of the movement of the weight on the arm being obstructed by ice or sleet, or from any other cause.

The joint in the link $m\, m'$ is so formed as to permit upward deflection only from near a right line, and in practice is covered by a cap-plate, to protect it from sleet or ice, which would interfere with its action.

The hub of the wind-wheel is made in two parts, $n\, n^1$, though in practice these are cast together in one piece, forming a double hub, provided with short radial tubular arms or sockets, arranged in pairs $n^2\, n^3$, set opposite each other or side by side, as shown. The radial arms or spokes of the wheel consist of a rod, $p$, made by preference from gas-pipe, as giving the required strength with the least weight of metal, and these are bent midway of their length at $p^2$, with the arm $p^1$ diverging slightly from the arm $p$ as it approaches the hub $n\, n^1$, for giving it a bracing action, and the two ends are secured in the tubular sockets $n\, n^1$ by set-screws or other suitable fastening device for holding them firmly united therewith.

The arms $p$ are united to the rings F' of the wheel by means of clamps S, made in two parts, $s\, s^1$, (see Fig. 3,) one made in angular form, notched at $s^2$, to receive a tongue or ear, $t$, on the other, and both being perforated and slipped on the rod or arm $p$ before the latter is secured to its hub, the two parts are united by through-bolts or other equivalent fastening device, clamping the ring firmly between them, as shown in Fig. 1.

Having now described my invention, what I claim as new, and desire to secure by Letters Patent, is—

1. The combination, with a wind-wheel adapted to vibrate or swing from a position at or near a right angle to its vane to one parallel, or nearly so, therewith, of a sliding weight, for giving increased resistance as the wheel moves from its position at right angles, substantially as described.

2. The combination of the vibrating lever K, provided with the sliding weight, with the the turn-table or swinging wind-wheel and its vane, substantially as and for the purpose described.

3. The lever K, mounted on a swiveling-fulcrum, I, and provided with a sliding weight, in combination with the wind-wheel, vibrating relatively to its vane, as described.

4. The sliding weight M on the arm or lever K, in combination with the link for moving said weight out and in on said arm or lever, as described.

5. The jointed folding link $m\, m'$, in combination with the weight M, sliding on the arm or lever, as described.

6. The sliding weight on the vibrating arm or lever K, connected by its actuating link with the arm H, at a point above the fulcrum of said lever, as described.

7. The radial wheel arms or spokes $p\, p^1$, made from a single rod or piece, bent back upon itself, and having both arms or ends connected with the central hub, substantially as described.

8. The clamps S consisting of the interlocking-plates $s\ s^1$, for uniting the wheel with its arms, as described.

9. The perforated clamp-plates $s\ s^1$, in combination with the double arm $p\ p^1$, having the bracing arrangement described, for uniting said arms to the wind-wheel, as set forth.

10. The cylinder $B^1$, provided with the anti-friction metal bearings $b\ b^1$, the former made in hollow hemispherical or conical form, and applied and operating as described.

GEO. S. STRONG.

Witnesses:
ALEXANDER MAHON,
JOHN G. CENTER.